Patented Nov. 30, 1937

2,100,337

UNITED STATES PATENT OFFICE 2,100,337

ZIRCONIUM OXIDE OPACIFIER AND METHOD OF MAKING SAME

Charles J. Kinzie, Niagara Falls, N. Y., assignor to The Titanium Alloy Manufacturing Company, New York, N. Y., a corporation of Maine No Drawing. Application June 22, 1935, Serial No. 27,869

9 Claims. (Cl. 106—36.2)

My invention relates generally to the production of pigmenting or opaquing compounds composed chiefly of zirconium oxide for use in vitreous enamels and in other glass products that will have high opaquing values, and its objects comprise improved methods for eliminating the impurities that would discolor the final enamel so as to render the latter of the desired whiteness and opacity.

The increasing importance of zirconia or zirconium oxide as an opacifier in lieu of tin oxide, antimony oxide, etc., in enamelling, has recently stimulated invention of various processes for more perfectly concentrating or separating it from such, for some purposes, undesirable, impurities, for example silicon, iron, titanium, etc., or their compounds, more or less of which respectively are usually found associated therewith as in the natural ores.

My invention relates more particularly to the derivation of high opacity zirconium oxide from zirconium oxides resulting from the electro-thermal decomposition of zircon ($ZrSiO_4$), into ziconium intermediates, such as zirconium cyanonitride, carbides or carboxides, and then calcining same to the oxide in contact with oxygen.

Zirconium oxides produced by such methods contain impurities such as silicon carbide and other carbides which render same unsuited for vitreous enamel opaquing purposes as well as for paint and lacquer pigment purposes.

In case of vitreous enamels, glazes, etc., the zirconium oxide containing such impurities yields enamels having a grayish color and poor gloss, while in paints and lacquers such impure $ZrO_2$ products could not impart a white pigmenting.

In this enameling art relative percentage opacity readings by which the degree of opacification is now determined for enamels by the reflectance test are obtained through the use of instruments known as opacimeters. Such opacimeters are in general use in the ceramic industry, and certain standards have been set up where the enameled article has two coats of enamel successively applied and fired. An opacity reading of 52½ represents an enamel with no mill addition of opaquing agents except the usual clay, and was used in my herein described tests as a standard of comparison for white enamels.

The products produced by either of the methods described in my U. S. Patents No. 1,562,890 of November 24, 1925 or No. 1,588,476 of June 15, 1925, although effective in destroying and overcoming the discoloring impurities, have failed to produce the present-day requirements in respect to the degree of opacity. For instance, the product of either of the referred to patents will yield an enamel of opacity reading of 66 to 67 in comparison with readings of 72 to 79 for the products of my present invention.

In the following examples of my improved methods where I refer to opacity readings, I refer to readings made with an opacimeter made on enameled specimens having the white test enamel applied at rate of 72 grams per sq. ft. and then fired.

The enamel used was one having the following characteristics:

When milled with no mill addition of opacifier, that is with only 6 percent clay, and applied at rate of 72 grams per sq. ft. total in two coats, and then fired two and one-half minutes at 1500° F., an opacity reading of 52½ was obtained.

This enamel, used for illustrative purposes, is a typical general purpose cover coat enamel for the vitreous enameling of sheet iron.

When 6% of tin oxide was added to such enamel at mill along with the clay and then applied and burned two and one-half minutes at 1500° F., an opacity reading of 71½ was obtained.

My improved methods comprise first, if necessary, milling the electro-thermic $ZrO_2$ products derived indirectly from zircon, and then forming the finely milled zirconium oxide into suitable sized briquettes, balls or nodules, and heating these shapes to about 950–1050° C. in an atmosphere of chlorine gas for a period of time sufficient for the chlorine gas to penetrate the shapes, destroy the objectionable carbon containing impurities and also remove partially or completely such impurities as titanium and iron, etc. Such reaction effects the changes in or on the $ZrO_2$ particles which are responsible for the increased opacity. I then remove the residual product from the reaction chamber and heat same in an oxidizing atmosphere to expel any excess of absorbed or adsorbed chlorides and also to oxidize any residual carbon, which is thereafter followed by disintegrating it to a fine state in water, then washing with water and drying same.

The oxidation step could of course be carried on in the chlorinating chamber by replacing the chlorine with air while maintaining the heat.

Chemical examinations show that the end $ZrO_2$ product contains a small amount of chlorides, approximately 0.02 to 0.15 percent in different runs.

The following complete Example A will serve as the detailed example, as to how my improved methods may be practiced.

Example A.—In this example the starting zirconium oxide is a $ZrO_2$ product obtained by the oxidation of zirconium carboxide as set forth in the application for patent of Donald S. Hake and myself Serial No. 713,536 filed March 1st, 1934. Although this product chemically is relatively pure $ZrO_2$, it still contains a small amount of silicon carbide as an impurity.

In our said application Serial No. 713,536, zircon or zirconium silicate is mixed with carbonaceous material and the charge is subjected to heating at high temperatures in an electric resistance furnace to decompose without fusing the zirconium-containing materials to form a zirconium compound containing zirconium, carbon and oxygen having the structural formula (ZrO.C) and consisting of an opaque black powder substantially free of silicon and iron with less than ½ or 1% of titanium.

This type of zirconium oxide as so produced is extremely fine and usually no milling is necessary, particularly if the fine $ZrO_2$ is separated from any of the coarse crystalline $ZrO_2$ which may be present.

The material is now formed in nodules by mixing this zirconium oxide 1000 grams in a Solution of gum tragacanth containing
0.01 gm. gum per c. c. solution_____ 200 c. c.

and adding water sufficient to form a stiff mud mass which is formed into balls and then thoroughly dried at about 150° C.

The dried balls are charged in a gas tight reactor of suitable material, such as a fused silica tube, equipped with suitably tight terminal connections, and the air is displaced with dry chlorine gas.

The tube is heated externally to a temperature between 950° C. and 1050° C., and the chlorine gas flow is continued for about four hours at these temperatures or until the desired reactions have been completed.

Upon opening the system there will be found a brown sublimate, chiefly solid but damp with liquid tetrachlorides, such as $SiCl_4$ resulting from the decomposition of the SiC, and also with $TiCl_4$ from the partial conversion of the titanium compounds in the $ZrO_2$. The bulk of the sublimate consists of $ZrCl_4$ discolored by $FeCl_3$.

In discharging these balls of $ZrO_2$ there usually adheres a little of the tetrachlorides, and I prefer to immediately calcine in air at about 900° C. to eliminate those residual or adhering chlorides. The residue on calcination usually is about 95 to 98 percent of the weight of the starting $ZrO_2$. The nodules are now disintegrated in water, washed several times and dried.

The resulting product is light buff in color and is approximately of the following composition:—

| | Percent |
|---|---|
| $ZrO_2$ | 98.84 |
| $SiO_2$ | 0.50 |
| $TiO_2$ | 0.10 |
| $Fe_2O_3$ | 0.01 |
| Chlorides (calculated as chlorine) | 0.05 |
| Others, $Al_2O_3$, etc | 0.50 |
| | 100.00 |

This material is too fine to permit of determining the characteristics of the particles, or to observe if the surfaces have been affected. I can therefore only offer the markedly increased opacity in enameling which has convinced me that an important and hiherto unknown change in such zirconium oxide opacifiers has been produced.

When 6 parts of this product of Example A were used at the mill along with 100 parts of the general purpose enamel frit hereinbefore described and 6% clay, milled with water to a suitable fineness with the enamel applied in two coats (total weight 72 grams per sq. ft.) with firing at 1500° F. two and one-half minutes, the opacity reading was 79.

On the other hand when the same starting $ZrO_2$ was converted to an opacifier by process and as described in my U. S. Patent No. 1,588,476 and the opacifier used in exactly the same manner in above general purpose enamel, the reading was 66, while in comparison tin oxide under same conditions gave an opacity reading of 71½.

It is important to note that although the opacifier product of Example A was buff in color, the resulting enamel produced was pure white in color and of a high degree of opacity as I have mentioned from the opacity reading on the B. & L. opacimeter of 79.

*Example B.*—The starting $ZrO_2$ in this example was obtained by the calcination to the oxide of the zirconium cyanonitride and zirconium carbide produced by the methods set forth in United States Letters Patent No. 1,342,084 to Barton of June 1, 1920. The material treated according to the Barton methods was the purified zirconium silicate as produced by the methods set forth in my pending application for patent filed May 27, 1933, Serial No. 673,322, which comprise essentially in mechanically separating the free silica and part of the remaining iron, titanium and other impurities from the lixiviated product of U. S. Letters Patent to Barton and Kinzie No. 1,451,004 of April 10, 1923 which results in an improved zirconium silicate having approximately the following composition by chemical analysis:—

| | Percent |
|---|---|
| $SiO_2$ | 32.61 |
| $ZrO_2$ | 66.00 |
| $TiO_2$ | 0.15 |
| $Fe_2O_3$ | 0.10 |
| $Al_2O_3$, etc | 1.14 |
| | 100.00 |

The starting $ZrO_2$ was of the following approximate composition:

| | Percent |
|---|---|
| $ZrO_2$ | 97.00 |
| SiC | 0.50 |
| $SiO_2$ | 1.00 |
| $Fe_2O_3$ | 0.05 |
| $TiO_2$ | 0.20 |
| Others, $Al_2O_3$, etc | 1.25 |
| | 100.00 |

This starting zirconium oxide product just described was treated in same manner as described in Example A, except that the zirconium oxide product of this Example B is milled with water in an iron or rubber lined ball mill using iron balls; the milling is continued until practically all the $ZrO_2$ particles have been reduced to about two microns or finer in size. Then the charge is removed from the mill and the iron which has been worn off the balls, lining (if iron lined mill was used) is dissolved by suitable acid treatment by the use of sufficient of either dilute sulphuric or hydrochloric acid to dissolve the iron which is then washed out and away from the zirconium oxide by any suitable means.

From this point on the procedure of Example

B is the same as in Example A in respect to nodulizing, chlorine treatment and final calcination that has been described.

The final product of Example B was approximately of the following composition:—

| | Percent |
|---|---|
| $ZrO_2$ | 97.83 |
| $SiO_2$ | 0.97 |
| $Fe_2O_3$ | 0.01 |
| $TiO_2$ | 0.13 |
| Chlorides (calculated as chlorine) | 0.06 |
| Others | 1.00 |
| | 100.00 |

Six percent of this Example B product added at the mill along with clay and the frit milled, etc. and then applied in two coats with a total 72 grs. per sq. ft., gave an opacity reading of 74½, while 6 percent of a product produced from same kind starting $ZrO_2$ by my process as described in my U. S. Patent No. 1,588,476 produced an enamel with reading of 67.

When the starting $ZrO_2$ Example B was used with 6 percent at the mill after fine milling, etc., but before my chlorine treatment, the enamel was gray in color, poor in surface due to the silicon carbide and possibly other impurities characteristic of this $ZrO_2$.

In the examples I have avoided silica and other mill media contamination by the use of iron milling media. This is desirable because the higher the percentage of zirconium oxide or zirconia, the more opacity the products will give.

However it is a fact that for many practical applications the milling may be effected in silex-lined mills with flint pebbles or in porcelain-lined mills with porcelain balls. In such event the silicon would be about 1 to 3 percent higher in each of the end products of Examples A and B. Where porcelain lined mills with porcelain balls were used, the end products of Examples A and B would contain about two to four percent of porcelain in a finely-divided state.

The use of mills lined with either of these non-metallic linings, or mills lined with rubber with either flint pebbles or porcelain balls, of course, eliminates the necessity for the acid treatment for dissolving iron, but to counteract this advantage the rubber or iron lined mills work faster and the shorter milling time and greater efficiency, at least in part, balances the necessity for the acid treatment.

Other methods of milling could readily be used, such as for example, dry grinding with air or water separation of the fines from the coarse, but generally I prefer the wet-ball mill method I have described.

In the foregoing examples showing my invention, I have disclosed how the opacity imparting power of zirconium oxides resulting from the electro-thermic decomposition of zircon and zirconium ores into carbon and nitrogen compounds or carboxides followed by oxidation to the oxide, can be markedly improved by a reaction with chlorine gas at about 950° to 1050° C. upon actual enameling results with opacity measurements as evidence of what I have accomplished by my novel treatments and improved methods.

Obviously instead of the pure zirconium starting materials, crude zirconium oxides containing titanium and iron in appreciable amounts would be relatively improved, but I prefer the pure materials as these alone appear to give the desired white opaque results. But the invention should not be restricted to such materials as $ZrO_2$ products from either of the two electro-thermic reactions of Examples A and B, for $ZrO_2$ products containing several percent $TiO_2$ and less iron residual from the use of crude zircon and zirconium ores could be used similarly for improved opaquing; however the color and general properties would not be as good as in the case with the pure materials.

I claim as my invention:

1. The method of making a vitreous enamel white opacifying composition which comprises electro-thermally converting without fusion zirconium-containing materials mixed with a carbonaceous reducing agent to elimination of substantially all the silicon therein, heating the resulting product to oxidation to form a product composed chiefly of zirconium oxide but also containing undesired impurities, then heating said product to about 950° to 1050° C. in the presence of chlorine to reduce and volatilize the impurities including substantially all the iron and titanium, and finally calcining the residual product to eliminate substantially all the chlorides therefrom.

2. The method of making a vitreous enamel white opacifying composition which comprises electro-thermally converting without fusion zirconium-containing materials mixed with a carbonaceous reducing agent to elimination of substantially all the silicon therein, heating the resulting product to oxidation to form a product composed chiefly of zirconium oxide but also containing undesired impurities, then heating said product to about 950° to 1050° C. in the presence of chlorine in an amount in excess of that required to reduce and volatilize the impurities including substantially all the iron and titanium, and finally calcining the residual product to eliminate substantially all the chlorides therefrom.

3. The method of making a vitreous enamel white opacifying composition which comprises heating a finely-divided zirconium oxide compound obtained from zircon by decomposition but without fusion in the form of zirconium-carbon intermediates at elevated temperatures in the presence of chlorine to reduce and remove the carbon-containing impurities and also substantially all the iron and titanium, and then calcining the residual product to eliminate substantially all the chlorides therefrom.

4. The method of making a vitreous enamel white opacifying composition which comprises heating to oxidation finely-divided zirconium compounds in the form of zirconium-carbon intermediates, then nodulizing and subjecting the charge to the action of chlorine gas at elevated temperatures to reduce and remove the carbon-containing impurities and also substantially all the iron and titanium, and finally calcining the residual product in an oxidizing atmosphere to eliminate substantially all the chlorides therefrom.

5. The method of making a vitreous enamel white opacifying composition which comprises heating to oxidation a finely-divided zirconium complex containing zirconium, carbon and oxygen having the structural formula $(ZrO.C)$, then subjecting the charge to an elevated temperature in the presence of chlorine to reduce and remove the carbon-containing impurities and also substantially all the iron and titanium, and finally calcining the residual product in an oxidizing atmosphere to eliminate substantially all the chlorides therefrom.

6. The method of making a vitreous enamel white opacifying composition which comprises calcining to oxidation a zirconium cyanonitride consisting of chemically combined zirconium, nitrogen and carbon, then subjecting a finely-milled nodulized mass of the residual product to the action of chlorine gas at elevated temperatures to reduce and remove the carbon-containing impurities and also substantially all the iron and titanium, and then calcining the residual product to eliminate substantially all the chlorides therefrom.

7. The method of making a vitreous enamel white opacifying composition which comprises calcining to oxidation a zirconium carbide, then subjecting a finely-milled nodulized mass of the residual product to the action of chlorine gas at elevated temperatures to reduce and remove the carbon-containing impurities and also substantially all the iron and titanium, and then calcining the residual product to eliminate substantially all the chlorides therefrom.

8. The method of making a vitreous enamel white opacifying composition which comprises calcining to oxidation a zirconium carbide, milling the residual product and treating same with dilute acid, then subjecting a finely-milled nodulized mass of the residual product to the action of chlorine gas at elevated temperatures to reduce and remove the carbon-containing impurities and also substantially all the iron and titanium, and then calcining the residual product to eliminate substantially all the chlorides therefrom.

9. A vitreous enamel white opacifying composition characterized as being of fine particle size and composed substantially of extremely fine particles of zirconium oxide from 97 to 99%, silicon from 0.50 to 1.00%, iron about 0.01%, titanium from 0.10 to 0.15%, a residual chlorine content about 0.05%, and having an opacity reading from 72 to 79.

CHARLES J. KINZIE.